April 21, 1936. E. C. SPIEGLER ET AL 2,038,011
MOUNTING FOR VEHICLE WHEELS
Filed March 18, 1935
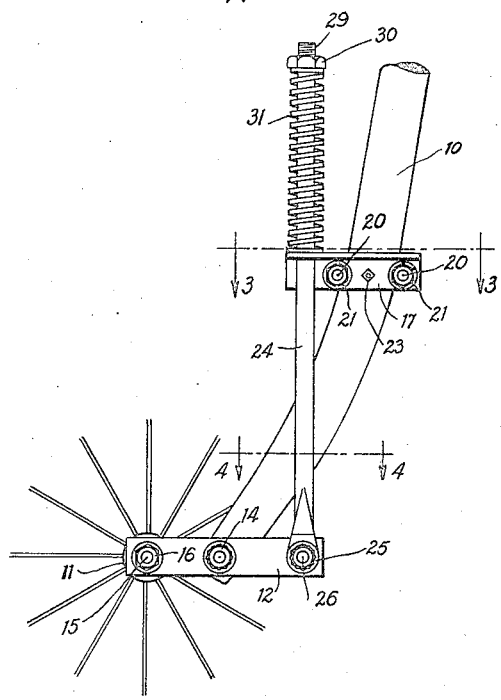
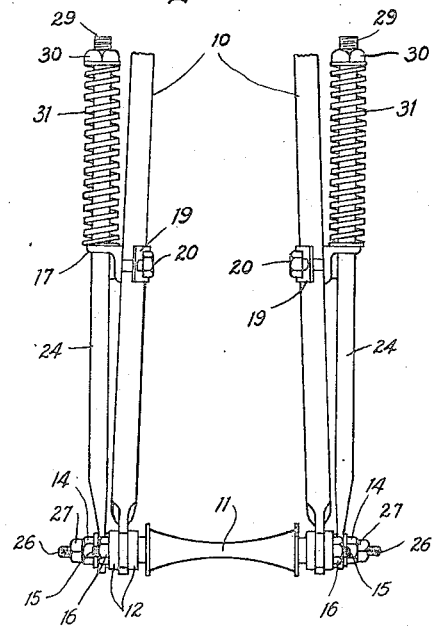
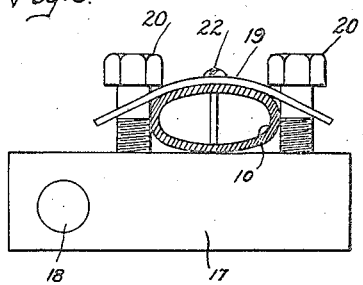
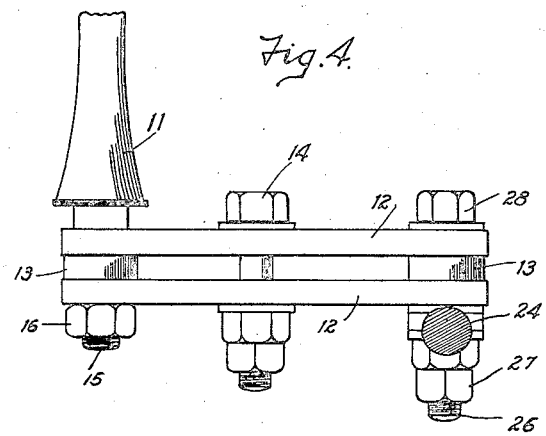
INVENTORS
EARL C. SPIEGLER
FRANK J. KUDRNA JR.
BY
ATTORNEY.

Patented Apr. 21, 1936

2,038,011

UNITED STATES PATENT OFFICE 2,038,011

MOUNTING FOR VEHICLE WHEELS

Earl Charles Spiegler and Frank J. Kudrna, Jr., Chicago, Ill.

Application March 18, 1935, Serial No. 11,621

3 Claims. (Cl. 208—101)

This invention relates to improvements in mounting for vehicle wheels, particularly adapted, though not necessarily limited in its use, with bicycles, and one of the objects of the invention is to provide an improved shock absorbing device adapted for universal use, that is for use with any type of bicycle, whereby the customary rigid fork and spring member with the wheel mounting may be readily converted into a resilient cushioning construction, without the necessity of dismantling any of the parts of the bicycle except the removal of the wheel to which the attachment is to be applied.

The present invention further contemplates in its use tension rods resiliently connected to the bicycle fork, and it is another object of the invention to provide an improved construction of mounting whereby comparatively light and shorter tension rods may be employed than heretofore, thereby not only reducing to a minimum the weight of the attachment, but also avoiding the danger of the rods buckling or bowing under compression.

To the attainment of these ends and the accomplishment of other new and useful objects as will appear, the invention consists in the features of novelty in substantially the construction, combination and arrangement of the several parts hereinafter more fully described and claimed and shown in the accompanying drawing illustrating this invention, and in which Figure 1 is a side elevation of a device of this character constructed in accordance with the principles of this invention, and showing the same applied to one of the forks of a bicycle, a portion of the wheel also being shown.

Figure 2 is a left hand end elevation of Figure 1.

Figure 3 is a detail sectional view taken on line 3—3, Figure 1, on an enlarged scale.

Figure 4 is a detail sectional view taken on line 4—4, Figure 1, with parts omitted, and on an enlarged scale.

Referring more particularly to the drawing, the numeral 10 designates the rigid forks of an ordinary bicycle construction and 11 designates the hub of a wheel ordinarily journaled at the lower ends of the fork members 10.

Connected to the lower end of each of the fork members is a lever constructed of spaced parallel members 12, and these members are held spaced by means of spacing blocks 13 arranged preferably at the ends of the members.

The lower end of each of the fork members 10 projects into the space between each pair of members 12 and the levers thus formed are pivotally connected to the lower end of the respective fork members by means of a fastening bolt 14 passing through the members 12 and also through the end of the fork 10.

The levers are pivotally supported by the lower end of the fork members intermediate their ends and the extremities of the levers project for a substantial distance in front of and to the rear of the respective fork members 10.

The hub 11 of the wheel is journaled at the forward end of the levers 12 by means of threaded extensions 15 on the hub passing through the members 12 and also through one of the spacing members 13. A nut or collar 16 is threaded upon the extensions 15 to hold the wheel against displacement with respect to the levers 12.

The numeral 17 designates a bracket which is preferably of an L shaped configuration and is provided with an opening 18 therethrough. One of these brackets is adapted to be adjustably secured to each of the fork members 10, and to that end there is provided a leaf spring or resilient member 19 which contacts with the opposite face of the fork member and is of a length greater than the cross sectional diameter of the fork member. Screws 20 pass through the member 19 adjacent the edges of the fork member 10, and nuts 21 may be threaded on the end of the screws 20 for securing the bracket in position.

If desired an additional fastening element or screw 22 may be provided, which passes through the member 19 and also through the fork member 10, as well as through a portion of the bracket 17, and a nut or collar 23 may be threaded on the end of the bolt or fastening member 22.

With this improved construction it will be manifest that the bracket 17 may be secured at any point throughout the length of the fork members 10, as all that will be necessary will be to provide an aperture through the fork member and through which aperture the fastening bolt or rod 22 passes.

The bracket is secured in position to the fork member so that the opening 18 therein will be disposed at a substantial distance in advance of the front edge of the respective fork members, and a tension rod 24 is pivotally connected by one end as at 25 to the other end of the respective levers formed by the members 12. The fastening elements 26 forming the pivots for the respective tension rods 24 pass through the respective pairs of members 12, the spacing member 13 and the tension rod 24, a nut or collar 27 being threaded upon the end of the member or element 26. This nut 27 cooperates with a head 28 on the other end of the member 26 to hold the parts in assembled position.

Each of the tension rods is arranged vertically and passes through the opening 18 in the respective bracket members 17 to extend for a substantial distance thereabove, the upper extremity of the tension rod being threaded as at 29 to receive a nut or collar 30.

A resilient element 31, preferably in the form of a coiled spring, encompasses each of the tension rods 24 above the respective brackets 17, one end of the tension member 31 resting against the bracket, while the other end contacts with the adjustable nut 30 on the end of the tension rod 24.

Obviously, by adjusting the nut 30 on the tension rod 24, the stress of the resilient element or spring 31 may be varied.

One of these devices being located on each of the forks of the bicycle, it will be manifest that an efficient cushioning device will be provided, as when the wheel strikes an obstruction the levers at the ends of the forks 10 will be moved about their pivots 14 against the stress of the resilient elements or springs 31, and as soon as the wheel passes the obstruction, the energy stored in the springs or resilient elements 31 will return the wheel to its normal position.

It will also be manifest that by reason of this construction, it is not only possible to provide shorter tension rods 24, thereby obviating the danger of buckling or bending under strain, but the bracket may be adjusted or secured at any point along the fork 10.

It is also possible with this construction to equip an ordinary bicycle with this invention without the necessity of dismantling any of the parts of the bicycle, except the front wheel.

While the preferred form of the invention has been herein shown and described, it is to be understood that various changes may be made in the details of construction and in the combination and arrangement of the several parts, within the scope of the claims, without departing from the spirit of this invention.

What is claimed as new is:—

1. The combination with a bicycle fork, a lever pivotally mounted intermediate its ends to the lower end of each fork member, each of said levers comprising spaced parallel members, the lower end of each fork member being positioned between the parallel members of the corresponding lever, said levers projecting a substantial distance in front of and to the rear of the respective members of the fork, a wheel journaled to the forward ends of the levers, a tension rod pivoted at one end between the members of the respective pairs of members, a bracket adjustably secured to each of the forks, said tension rods loosely passing through the respective brackets, a shoulder on each of the tension rods above the brackets, and a spring encompassing each of the tension rods above the brackets and contacting with the respective brackets and shoulders, for yieldingly resisting the movement of the respective levers about their pivots.

2. The combination with a bicycle fork, a lever pivotally mounted intermediate its ends to the lower end of each fork member, each of said levers comprising spaced parallel members, the lower end of each fork member being positioned between the parallel members of the corresponding lever, said levers projecting a substantial distance in front of and to the rear of the respective members of the fork, a wheel journaled to the forward ends of the levers, a tension rod pivoted at one end between the members of the respective pairs of members, a bracket for each of the tension rods, means adjustably securing the brackets to the respective fork members, the said means embodying a resilient member contacting the face of the fork opposite to the face adjacent which the bracket is located, screws passing through the said resilient member beyond each edge of the fork members and entering the respective brackets, said tension rods loosely passing through the respective brackets, a shoulder on each of the tension rods above the brackets, and a spring encompassing each of the tension rods above the brackets and contacting with the respective brackets and shoulders, for yieldingly resisting the movement of the respective levers about their pivots.

3. The combination with a bicycle fork, a lever pivotally mounted intermediate its ends to the lower end of each fork member, each of said levers comprising spaced parallel members, the lower end of each fork member being positioned between the parallel members of the corresponding lever, said levers projecting a substantial distance in front of and to the rear of the respective members of the fork, a wheel journaled to the forward ends of the levers, a tension rod pivoted at one end between the members of the respective pairs of members, a bracket for each of the tension rods, means adjustably securing the brackets to the respective fork members, the said means embodying a resilient member contacting the face of the fork opposite to the face adjacent which the bracket is located, screws passing through the said resilient member beyond each edge of the fork members and entering the respective brackets, an additional fastening device passing through each of the said resilient members and entering the respective fork members, said tension rods loosely passing through the respective brackets, a shoulder on each of the tension members above the brackets, and a spring encompassing each of the tension rods above the brackets and contacting with the respective brackets and shoulders, for yieldingly resisting the movement of the respective levers about their pivots.

EARL CHARLES SPIEGLER.
FRANK J. KUDRNA, Jr.